Sept. 20, 1955    R. J. WHITE    2,718,365
DEFORMATION COMPENSATOR FOR AIRCRAFT CONTROLS
Filed April 30, 1953
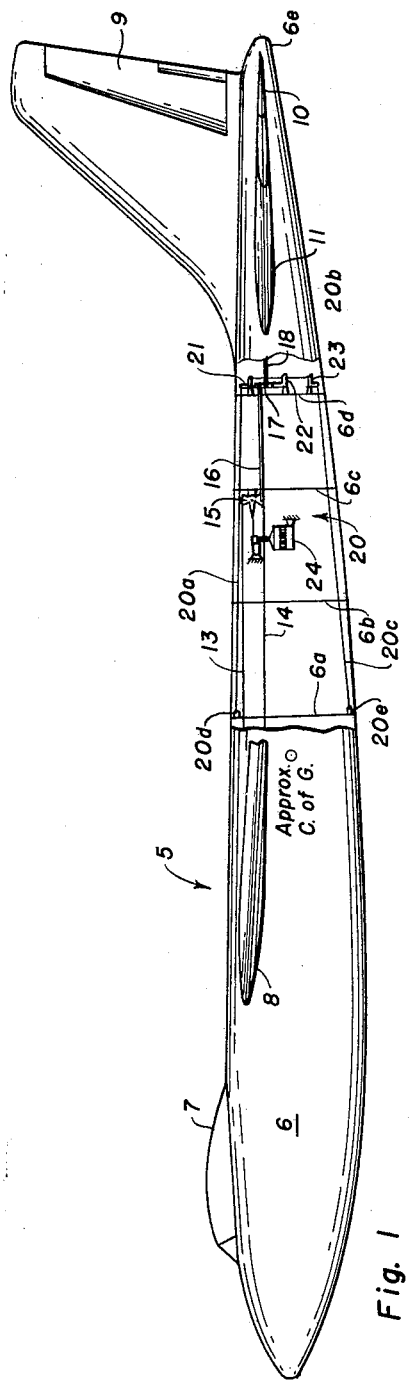
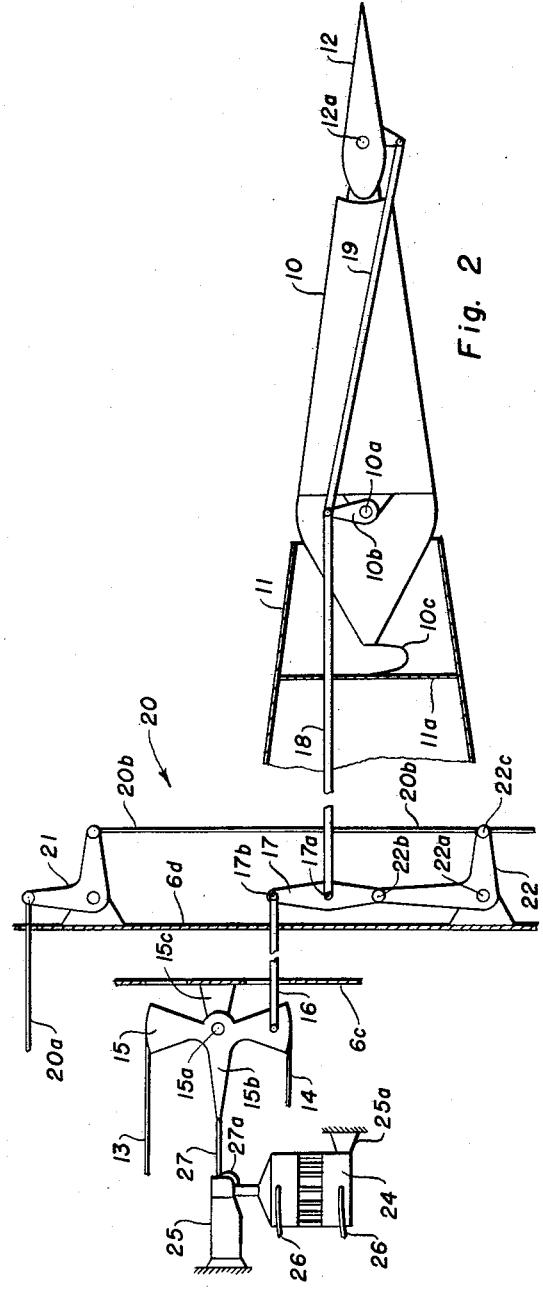
Roland J. White
INVENTOR.
BY
HIS PATENT ATTORNEY.

United States Patent Office 2,718,365
Patented Sept. 20, 1955

2,718,365
DEFORMATION COMPENSATOR FOR AIRCRAFT CONTROLS

Roland J. White, Seattle, Wash., assignor to Boeing Airplane Company, a corporation of Delaware Application April 30, 1953, Serial No. 352,202

7 Claims. (Cl. 244—82)

The present invention relates to aircraft controls and more particularly to improved control compensating means to correct for bending or other deformation in the aircraft structure.

In the operation of high speed aircraft elastic deformation of the structure frequently adversely affects the stability of the airplane. For example, in respect to longiingtudinal stability, when the airplane noses up the stabilizing upward air forces developed on the horizontal tail surfaces cause the fuselage body to bend upward thereby reducing the effectiveness of the horizontal tail surfaces by reduction in angle of attack of these surfaces and the consequent loss of lift. This loss in effectiveness in the horizontal tail surfaces is offset and prevented by the present invention which comprises essentially means for sensing and detecting the direction and magnitude of the bending in the fuselage and automatically compensating for such deformation by adjustment of the elevator and its tab in the proper direction. In other words, it increases the effectiveness of the elevator by causing it to be deflected downwardly as the body bends upwardly, and conversely, as the body is bent downwardly the elevator is deflected upwardly.

It is, accordingly, a primary objective of the present invention to provide improved means for increasing the effectiveness of the tail surfaces and for maintaining the stability of large high speed aircraft when subjected to elastic deformation of the structure. It is a further object to provide improved means for sensing and detecting the direction and magnitude of bending in the fuselage of an aircraft and for applying a compensating adjustment to the proper tab or control surfaces. A corollary object resides in improved compensating control mechanism for maintaining the effectiveness of the horizontal tail surfaces upon upward bending of the fuselage by automatically deflecting the elevator surfaces downwardly, and vice versa. It is a still further object to provide a light weight and effective deformation sensing means which permits of a convenient operative connection to the normal control mechanism for transmitting the corrective adjustment thereto.

Other objects and advantages of the present invention will occur to those skilled in the art after reading the following description taken in conjunction with the accompanying drawings, forming a part hereof, in which:

Fig. 1 is a side elevational view of an airplane with the fuselage partly broken away to show the application of a form of the improved compensating control mechanism applied thereto; and Fig. 2 is a similar view to an enlarged scale of the horizontal tail surface and the connection of the compensating means to the normal control mechanism.

Referring now to Fig. 1, the numeral 5 designates an aircraft of a relatively large high speed type having an elongated fuselage 6 and a control cockpit covered by the streamlined canopy 7. The airplane 5 is provided with sweptback wings or sustaining surfaces 8 and a tail or fuselage which includes a rudder control surface 9 and horizontal stabilizers 11 to the trailing portions of which are hinged the elevators 10, aft of which the fuselage may terminate in the tail cone portion 6e. The elevators 10 are each preferably provided with inset tab surfaces 12 (see Fig. 2) which are pivotally mounted adjacent the trailing edges thereof and are preferably actuated by the pilot through the normal control cables 13 and 14 which extend aft from the control cockpit 7 of the airplane.

The normal elevator control system preferably consists of suitable pilot and co-pilot control columns, a control disconnect rod, assembly control quadrants, a torque tube control installation with suitable cable tension regulators, a "Q"-spring assembly mechanical linkage to the elevators for providing "feel" and the necessary control cables. An automatic pilot servo unit and power control servo unit may also be connected to the control system in a conventional manner. The normal elevator trim tab control system may be linked to the elevator control system through a suitable "Q"-spring assembly 24 and the trim tab control arm 15 for the elevators. Near constant cable tension is maintained by suitable cable tension regulators which may be installed on the elevator control torque tube and elevator control cable motion is transmitted from the cable tension regulators and torque tube to the elevators through suitable crank arms and control rods. Approximately uniform elevator movement is maintained through the range of elevator travel by the elevator aerodynamic internal balance seal 10c attached to the stabilizer bulkhead 11a as well as balanced action of the elevator trim tabs which move opposite to elevator motion. Elevator travel is preferably limited by bottoming of the power control unit system.

Under power control conditions, it is desirable to provide artificial control "feel" which is obtained by the use of the "Q"-spring mechanism 24 supplied with air at ram pressure through the "Q" tubes 26 to supply the control "feel" proportionate to airspeed. The "Q"-spring mechanism 24 is so arranged that the neutral position is varied by changes in trim tab position. The "Q"-spring assembly accordingly supplies a force on the pilot control proportionate to airspeed when the power control unit is functioning. This assembly consists of two bellows chambers held rigidly to the fuselage structure by the brackets 25 and 25a. Each chamber is formed by a cone, a retainer, a coated fabric diaphragm between the retainer and the retainer ring, a shaft for attachment of cable 27, an accordion bellows to seal the shaft from the bellows chamber, and the "Q"-spring body 24. The cable 27 between the shaft and the "Q"-spring lever 15b rotates in a bearing in the top of the shaft to prevent cable twisting and the pulley bracket 25 for the pulley or sheave 27a is preferably supported by a tube rotating in bearings to prevent side loads. Ram air from an intake, which may be located in the vertical fin, enters the two bellows chambers and exerts a pressure on the retainer directly proportional to the airspeed. As the control torque tube is rotated in either direction, the "Q"-spring causes the "Q"-tab lever to rotate in the same direction. The rotation of the "Q"-tab lever creates a push or pull on a centering spring lever link which in turn imposes a rotary motion on the "Q"-spring lever. Rotation of the "Q"-spring lever in either direction from the neutral position will cause a pulling motion on the cable and a consequent compression of the two bellows chambers in the housing 24. This compression creates a force on the pilot control directly proportional to the airspeed to prevent overcontrol of the surface when the power control unit is in use. The "Q"-spring is inoperative when the power control unit is "off" to prevent the pilot from having to overcome this additional force to move the control surface. These details are part of the normal control system, and inasmuch as they do not comprise the novel feature of the present invention, they have been illustrated diagrammatically only in the drawings.

As shown in Fig. 2, and as referred to above, the normal pilot control mechanism for the tab 12 comprises the control cables 13 and 14 engaging the arcuate ends of the double bellcrank or rocking lever 15 pivotally mounted at 15a upon the bracket 15c secured to the fuselage bulkhead 6c. A push-pull link 16 is pivotally connected to the lower of the arms of the rocking lever 15 and is pivotally connected at its aft terminal to the upper terminal of the rocking lever 17. The lower terminal of the lever 17 is pivotally connected at 20b to the upper terminal of the bellcrank 22 which in turn is pivotally mounted at 22a upon the bulkhead 6d. An intermediate portion of the rocking lever 17 is pivotally connected at 17a to the rearwardly extending push-pull rod which is pivoted at its aft terminal to the lever 10b pivotally mounted to rotate about the elevator hinge 10a. The pivotal connection of the arm 10b with the push-pull link 18 disposed above the elevator 10a is connected with the operating bracket of the tab 12 by the push-pull link 19 at a point disposed below the tab hinge 12a. The above described "Q"-spring assembly also holds the control system from moving when the pilot is not using his controls. The horizontal stabilizer 11 is provided with a transverse bulkhead or wall 11a from which a flexible curtain or seal 10c is attached at one edge and at its opposite edge to the nose portion of the elevator 10 to provide a pressure balance of a conventional type for this surface.

The arrangement of the improved deformation compensating means is also indicated in Fig. 1 and comprises essentially a parallelogram type cable linkage system 20 formed by the cables 20a, 20b and 20c. The forward end of the upper cable 20a is fixedly anchored at 20d adjacent the top of the fuselage and to the transverse rigid bulkhead 6a in the region of the C. of G. of the airplane. Similarly the lower end of the lower cable 20c is anchored to the bulkhead 6a adjacent the bottom of the fuselage at 20e. These upper and lower cables comprising the cable parallelogram type compensating system extend aft toward the tail running through further transverse bulkheads, 6b, and 6c and are anchored to the bellcranks 21, 22 and 23 which are pivotally mounted upon the fuselage structure, such as upon the further bulkhead 6d.

The interconnection between the normal tab actuating mechanism and the compensating cable arrangement 20 is made by the connection 22c of the vertical compensating cable 20b to the intermediate bellcrank 22, pivoted at 22a. It will be understood that as the aft portion of the fuselage might be bent or deflected upwardly in respect to the C. of G. of the fuselage, the upper portion of the fuselage will be compressed and the lower portion placed under tension. This will cause the bellcranks 21, 22 and 23 to be rotated slightly in the clockwise direction due to the relative lengthening of the upper cable 20a with respect to the upper portion of the fuselage and the relative shortening of the lower cable 20c in its relation to the tensioned lower portion of the fuselage, and will therefore cause concurrent downward movement of the vertical compensating cable 20b. Similarly, if the aft portion of the fuselage is bent downwardly about the C. of G., or the region adjacent the bulkhead 6a, the reverse conditions take place and the vertical compensating cable 20b will be caused to move upwardly with respect to the bulkhead 6d thereby imparting counterclockwise rotation to the bellcranks 21, 22 and 23 about their respective pivots.

The operation of the automatic compensating means is as follows: In the event the aircraft is flown into a gust, or upwardly moving air, which causes the nose portion of the fuselage to be nosed upwardly, a resulting bending is imparted to the fuselage which causes the body to bend upwardly and thereby reduce the effectiveness of the horizontal tail. As this upward bending occurs, the vertical compensating cable 20b moves downwardly imparting partial rotation in the clockwise direction to the bellcrank 22 and due to its pivotal connection 22b it imparts similar movement, but in the counterclockwise direction, to the rocking lever 17 about its upper pivot 17b which is held relatively fixed in space by the normal control actuating mechanism and the action of the "Q"-spring unit 24. Accordingly, as the rocking lever 17 pivots about 17b it imparts rearward movement to the push-pull link 18 which is transmitted through the link 19 imparting counterclockwise rotation to the tab 12 about its hinge 12a. This upward movement of the tab 12 immediately imparts movement of the elevator 10 in the opposite sense, or downwardly, to an extent which compensates for the bending or deformation in the fuselage, and the disturbing force which caused it. It, accordingly, has the effect of providing a new mean position for the tab 12 and the elevator 10 and the pilot's control can be readily superimposed upon this compensated position for movement in either direction.

While the invention has been illustrated in connection with an elevator control surface it will be apparent that its principles are also applicable to rudder and other controls.

Other forms and modifications of the present invention, both in respect to its general arrangement and the details of its respective parts, are intended to come within the scope and spirit of this invention as more particularly set forth in the appended claims.

I claim:

1. In an aircraft, a fuselage having a tail portion, said tail portion including a stabilizer, a control surface pivotally mounted upon said stabilizer, a tab pivotally mounted upon said control surface, actuating mechanism for deflecting said tab for the actuation of said control surface, deformation sensing means including a cable anchored to said fuselage at each of its ends at vertically spaced points above and below the center of gravity of the aircraft, said cable having an intermediate portion operatively connected to said tab actuating mechanism whereby deformation of said fuselage initiates relative movement of said cable and corrective movement of said tab and said control surface.

2. In an aircraft, a body having a fixed stabilizer attached thereto, a control surface pivotally mounted upon said stabilizer, a tab pivotally mounted upon said control surface, actuating mechanism for deflecting said tab for the actuation of said control surface, deformation sensing means including an elongated tensioning element anchored to said body at each of its ends in the region of the center of gravity of said body in such manner that an intermediate portion of said tensioning element is operatively connected to said tab actuating mechanism and is caused to move said mechanism upon deformation of said fuselage to thereby initiate relative movement of said mechanism and corrective movement of said tab.

3. In an aircraft, a fuselage having a tail portion, a horizontal stabilizer fixed to said fuselage tail portion, an elevator pivotally mounted upon said stabilizer, a tab pivotally mounted upon said elevator, actuating mechanism for deflecting said tab for the actuation of said elevator, deformation sensing means including a cable anchored to said fuselage in the region of its center of gravity at each end of said cable and having an intermediate portion of said cable operatively connected to said elevator actuating mechanism whereby deformation of said fuselage initiates relative movement of said intermediate cable portion with respect to a fixed point within said fuselage and initiates corrective movement of said tab.

4. In an aircraft having a body and a control surface pivotally mounted upon said body, means for correctively adjusting said control surface to compensate for deformation in said body comprising an elongated member fixed to said body at a point remote from said control surface and appreciably closer to the center of gravity of said body, said elongated member extending to a portion of said body in the region of said control surface where said elongated member is rotatively mounted upon said body at spaced points and from whence said elongated member extends through said body back to a point at which it is fixed to the body in the region of but spaced below its first point of fixation to said body in such manner that deformation of said body between the region of its fixation to said body and the region of said control surface is sensed by said elongated member and translated into relative movement of its rotatively mounted portion, and means operatively connecting said last said portion of said elongated sensing member to said control surface for corrective adjustments thereof.

5. In an aircraft having a body and a control surface pivotally mounted upon said body, means for correctively adjusting said control surface to compensate for deformation in said body comprising an elongated tension withstanding member fixed to said body at an upper portion in the region of its center of gravity, said elongated member extending to a portion of said body in the region of said control surface where said elongated member is rotatively mounted upon said body at vertically spaced points and from whence said elongated member extends adjacent the lower portion of said body back to a point at which it is fixed to the body in the region of its center of gravity, said elongated member arranged in such manner that deformation of said body between the region of its center of gravity and the region of said control surface is sensed by said elongated member and translated into relative movement of its vertically extending rotatively mounted portion, and means operatively connecting said vertically extending portion of said elongated deformation sensing member to said control surface for corrective adjustment thereof in proportion to the magnitude of deformation of said body.

6. In aircraft having a body and a control surface pivotally mounted upon said body, a tab pivotally mounted upon said control surface, means for correctively adjusting said tab and said control surface to compensate for deformation in said body comprising an elongated member fixed to said body at an upper portion thereof in the region of its center of gravity, said elongated member extending to a portion of said body in the region of said control surface where said elongated member is rotatively mounted upon said body at spaced points and from whence said elongated member extends adjacent the lower portion of said body back to a point at which it is fixed to the body in the region of its center of gravity, said elongated member arranged in such manner that deformation of said body between the region of its center of gravity and the region of said control surface is sensed by said elongated member and translated into relative movement of its rotatively mounted portion, and means operatively connecting said rotatively mounted portion of said elongated deformation sensing member to said tab and said control surface for corrective adjustment thereof.

7. In a compensating system for an aircraft, a fuselage having a tail portion, a control surface operatively mounted upon the tail portion of said fuselage, control mechanism operatively connected to said control surface for the operation of said control surface, continuous tension transmitting means comprising a vertically spaced pair of tension transmitting elements having their forward terminals anchored to a central portion of the fuselage and their after portions interconnected in the vertical direction whereby deformation of said fuselage due to bending forces imparts vertical movement to said vertically interconnected aft portion with respect to the adjacent portion of the fuselage and means for transmitting said vertical movement to said control mechanism for imparting compensating movements to said control surface upon deformation of said fuselage.

References Cited in the file of this patent

UNITED STATES PATENTS

| | | |
|---|---|---|
| 2,286,150 | Mercier | June 9, 1942 |
| 2,332,516 | Kemmer | Oct. 26, 1943 |
| 2,425,358 | Wasserman | Aug. 12, 1947 |
| 2,432,783 | Miles | Dec. 16, 1947 |
| 2,604,613 | Klass | July 22, 1952 |

OTHER REFERENCES

Technical Data Digest, vol. 16, No. 6, June 1951, page 5.